Aug. 23, 1966  P. E. MORTENSEN  3,267,553
TOOL HOLDERS
Filed Feb. 28, 1964  2 Sheets-Sheet 1
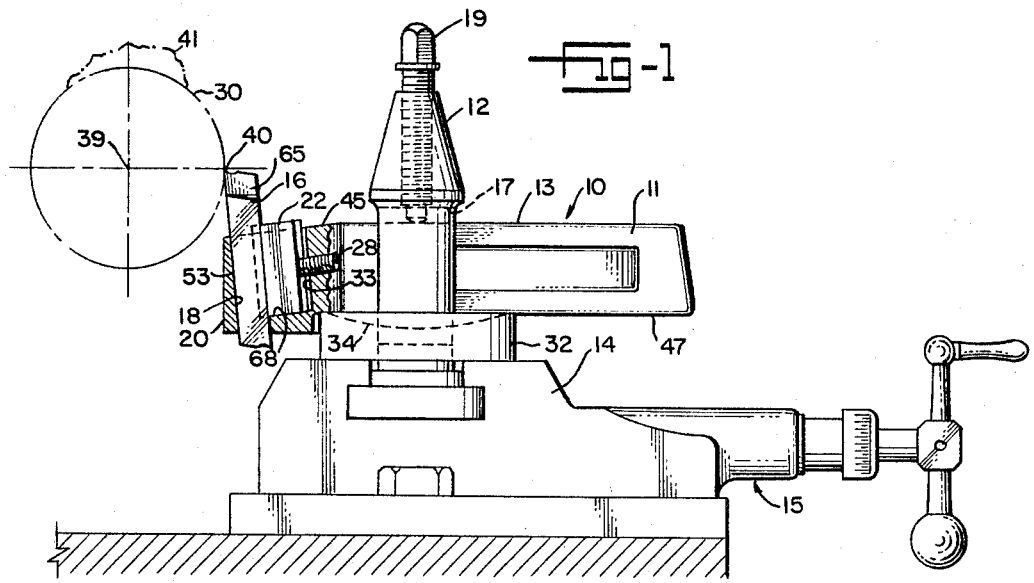
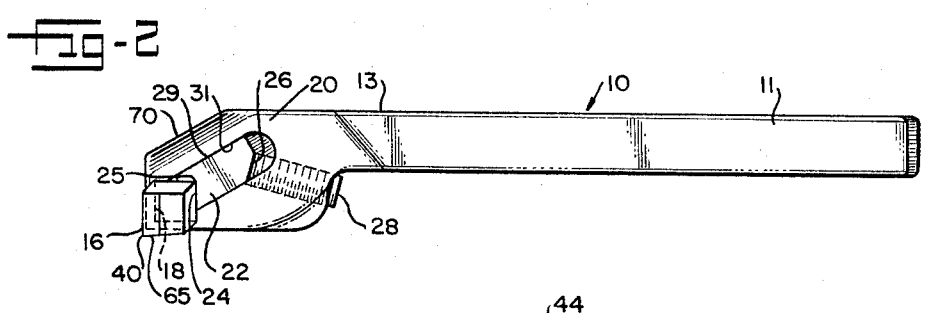
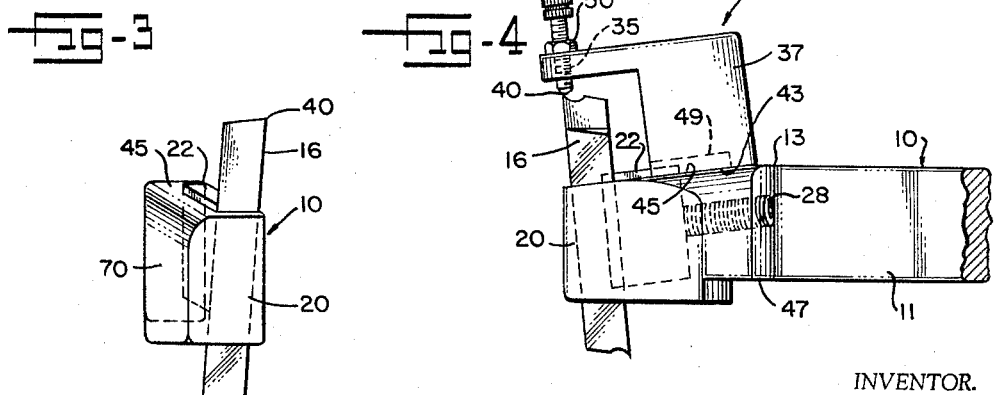
INVENTOR.
Peter E. Mortensen
BY
BUCKHORN, BLORE, KLARQUIST and SPARKMAN
ATTORNEYS Aug. 23, 1966
P. E. MORTENSEN
3,267,553
TOOL HOLDERS
Filed Feb. 28, 1964
2 Sheets-Sheet 2
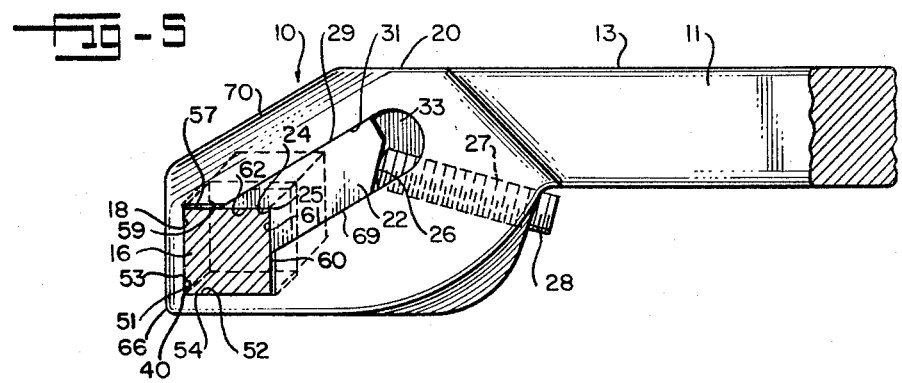
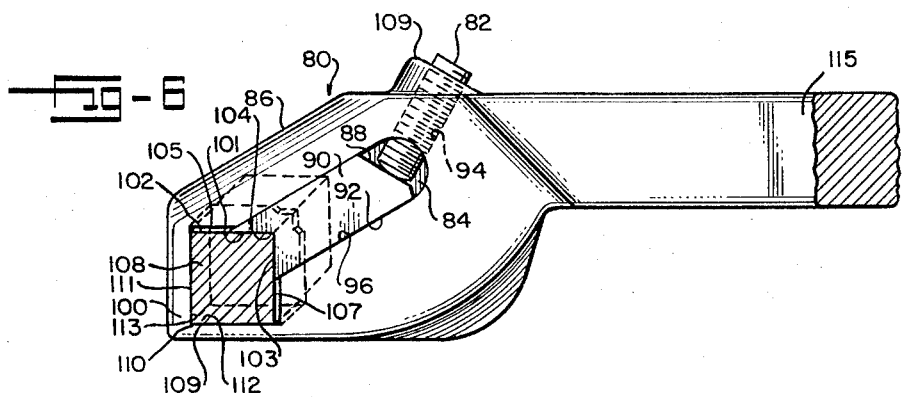
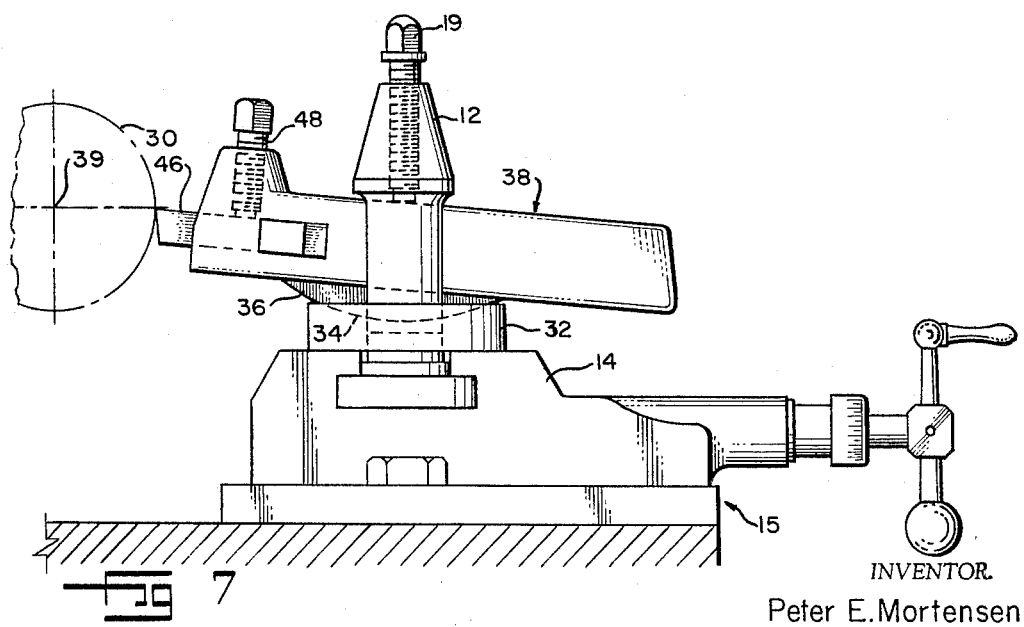
INVENTOR.
Peter E. Mortensen
BY
BUCKHORN, BLORE, KLARQUIST & SPARKMAN
ATTORNEYS United States Patent Office 3,267,553
Patented August 23, 1966

3,267,553
TOOL HOLDERS
Peter E. Mortensen, Milwaukie, Oreg., assignor to The Pem Company, Milwaukie, Oreg., a corporation of Oregon
Filed Feb. 28, 1964, Ser. No. 348,198
7 Claims. (Cl. 29—96)

This invention relates to tool holders, and more particularly to tool holders for lathes and gauges for setting the height of tools held by the tool holders.

In tool holders for lathes known hitherto, the tool height has had to be set while the tool holder is in the tool post and by trial and error, the tool being set by sliding the tool along the adjusting end of the tool holder and/or by rocking the tool holder on a rocker shoe in the tool post. Such procedures are difficult and time consuming, and there has been no way to precisely set the tools while the tool holder is removed from the tool post.

An object of the invention is to provide new and improved tool holders.

Another object of the invention is to provide new and improved tool holders for lathes and gauges for setting the heights of tools held by the tool holders.

A further object of the invention is to provide a tool holder and a gauge therefor in which the height of a tool may be precisely set forth while the tool holder is held by the tool post and when the tool holder is removed from the tool post.

Another object of the invention is to provide tool holders which are very rugged and hold the tools very strongly and precisely, while providing clearance of the tool holders for the head stock and tail stock of the lathes.

Yet another object of the invention is to provide tool holders having a minimum number of parts.

Another object of the invention is to provide tool holders which positively lock tools in precise positions.

Still another object of the invention is to provide a tool holder and a gauge therefor which sets a tool in the tool holder and in which the tool holder may be locked in the lathe in one position always so that no rocker shoe need be provided in the tool post.

The invention provides a tool holder having a shank adapted to rest on the base of a lathe post, and having a tool of rectangular cross section fitting in a notch or corner of a rectangular hole positioned at the forward end of the tool holder together with a notched clamping member slidable along a guideway and a locking screw adapted to press the clamping member toward the corner of the hole and against one side of the guideway so that the tool is held tightly by the tool holder. Preferably the tool holder has a gauging surface on the top thereof so spaced from the bottom of the shank portion of the tool holder that one arm of a generally U-shaped gauge having a second arm resting on the gauge surface will form an abutment to precisely locate the cutting edge of the tool for a given lathe, the gauge surface preferably extending perpendicularly to the longitudinal axis of the tool. Also, the clamping member preferably projects beyond the gauge surface, and the end of the second arm of the gauge has a guide slot slidable along the projecting portion of the clamping member to properly position the gauge on the gauge surface for setting the tool precisely in the tool holder.

A complete understanding of the invention may be obtained from the following detailed description of tool holders forming specific embodiments thereof, when read in conjunction with the appended drawings, in which:

FIG. 1 is a fragmentary, vertical sectional view of a lathe and a tool holder forming one embodiment of the invention;

FIG. 2 is an enlarged top plan view of the tool holder of FIG. 1;

FIG. 3 is a fragmentary elevation view of the tool holder of FIG. 1;

FIG. 4 is a fragmentary elevation view of the tool holder of FIG. 1 and a gauge for setting a tool in the tool holder;

FIG. 5 is an enlarged, fragmentary, horizontal sectional view of the tool holder of FIG. 1;

FIG. 6 is an enlarged, fragmentary, horizontal sectional view of a tool holder forming an alternate embodiment of the invention; and FIG. 7 is a fragmentary, vertical sectional view of a lathe and a tool holder illustrative of prior art tool holders.

Referring now in detail to the drawings, there is shown therein a tool holder 10 having a body member 13 (FIG. 1) having a shank 11 mounted in position in a slot 17 in a tool post 12 of a compound rest 14 of a lathe 15. A set screw 19 locks the tool holder in the tool post. A lathe tool 16 of square cross-section in the shank portion thereof is mounted in a generally complementary passage or guideway 18 extending slightly tilted from the vertical through the workpiece end or head 20 of the tool holder body. The tool is held in position by a clamping member 22 having a notch or groove 24 at one end for engaging a corner 25 of the tool 16 and an inclined face 26 at its opposite end engaged by clamping screw 28 extending through tapped bore 27 in the head 20 of the tool holder body member. Tightening of the screw 28 forces the clamping member 22 against the tool 16 to clamp it in the passage 18 and also forces guide face 29 (FIG. 5) of the clamping member against wall 31 of guideway 33 in the tool holder body member.

It will be noted that the tool 16 is inclined somewhat toward workpiece 30 mounted in headstock 41 of the lathe, as shown in FIG. 1, and is also inclined laterally with respect to the shank 11 of the tool holder body 13 as shown in FIG. 1. The shank 11 rests directly upon the edges of ring 32 of slotted tool post 12 having a concave upper surface indicated by dotted lines 34 instead of an a rocker element, such as the rocker element 36 shown in FIG. 7, employed with standard lathe tool holder such as a tool holder 38 shown in FIG. 7. Positioning of the cutting edge 40 (FIG. 1) of the tool 16 precisely at the height of center line 39 of the workpiece 30 is obtained by clamping the tool 16 in such an adjusted vertical position in the tool holder 10, as shown in FIG. 4, that cutting edge 40 engages the top of adjustment screw 44 of a generally U-shaped gauge 42 having an L-shaped body 37 having a guide slot 49 facing in the same direction as a lower plane surface 43 adapted to reset upon the upper, gauge surface 45 of the tool holder body member 13. The guide slot slidably engages the sides of the clamping member 22 and guides the gauge to a position in which the adjustment screw 44 is aligned with the cutting edge 40 of the tool to locate the cutting edge at a predetermined height above the bottom reference surface 47 of the shank 11 of the tool holder body member. Thus, the tool is inserted into the tool holder 10, the gauge 42 is held in position and the tool cutting edge engaged with the tip of adjustment screw 44 of the gauge and the clamping screw 28 then is tightened. The screw 44 extends through a tapped bore 35 in the laterally extending arm of the gauge body 37. The bore 35 extends normal to the plane of the lower surface 43 of the gauge body, and, once the screw is positioned to given the the precise setting of the tool for a particular lathe in which the tool is to be used, a nut 50 on the screw is tightened to lock the screw in that position. Then the gauge can be used to set the tool 16 in the tool holder 10 in the lathe or when the tool holder is removed from the lathe. Also, other tools in other identical tool holders can be precisely set for the lathe while the tool holders are out of the lathe.

As best shown in FIG. 5, the tool 16 is generally square in cross-section, and the head 20 of the tool holder body member 13 has notch-forming surfaces or sidewalls 51 and 52 extending along the entire length of the passage 18 and forming inside walls of corner 66 of the tool holder body member 13 and adjacent the corner cutting edge 40 of the tool 16. The corner 66 is at the extreme end of the body member 13. Corresponding sidewall surfaces 53 and 54 of the tool are pressed against the surfaces 51 and 52. Clamping surfaces 61 and 62 of the clamping member 22 adjacent the corner 25 of the tool engage the adjacent portions of the surfaces 59 and 60 of the tool 16. The surfaces 61 and 62 preferably extend the entire length of the notch 24. At its upper end portion the tool 16 is relieved as indicated by surface 65 which extends along the upper portion of the tool.

The clamping member 22 slides along the wall 31 when the screw 28 is tightened, and the surfaces 61 and 62 of the notch 24 move downwardly and to the left, as viewed in FIG. 5, to force the surfaces 53 and 54 of the tool tightly against the surfaces 51 and 52, respectively. The clamping member 22 is held by the screw 28 tightly against the wall 31 in a clamping position. The clamping member rests on and extends upwardly from bottom 68 (FIG. 1) of the guideway 33 to a plane above the gauge surface 45 to back up the tool 16 as high upon the tool as possible while permitting the top of the corner 66 of the head 20 of the tool holder body member 13 to be rather low for clearance purposes. The face 26 is at an angle of about 45° relative to the wall 31 and guide face 29. The notch 24 has its apex much closer to the face 29 of the clamping member 22 than to side face 69 parallel to and opposite the face 29 to permit the wall 31 to be quite thick and strong even through relieved at face 70 to provide clearance for the tailstock of the lathe. The bottom 68 (FIG. 1) of the guideway 33 is parallel to the gauge surface 45.

For purposes of comparison, the standard prior art tool holder 38 is shown in FIG. 7. With the tool holder 38, the cutting tool 46 extends generally longitudinally of the tool holder. It is clamped in position in the tool holder with a clamping member (not shown) engaging the top of the tool. The tool holder 38 of FIG. 7 requires the employment of the rocker member 36 to enable the height of the cutting edge of the tool 46 to be adjusted.

The upper end of the tool 16 shown in FIGS. 1 to 5 is a so-called turning tool primarily intended for removing metal from a cylindrical surface of a workpiece, and is shown in the drawings in the upper, operative position. The lower end of the tool 16 is of a face cutting configuration and the tool may be reversed end for end and rotated 90° about its longitudinal axis for facing cutting operations. The tool holder 10 will also hold threading tools. The particular tool holder 10 is a lefthand holder but will also be made in righthand form, the two forms being sufficient for all usual lathe work except boring which requires special tools and holders.

As stated above, tool 16 (FIG. 1) can be adjusted to the proper height so as to engage the workpiece 30 at the centerline 39 of the workpiece 30 by means of the gauge 42 shown in FIG. 4. The tool can be inserted and adjusted either while the tool holder 10 is mounted in the clamping post 12 or before it is mounted in such post. No rocker member 36 such as shown in FIG. 7 is required. Once adjusted, the tool holder and tool may be removed and reinserted in the tool post and the cutting edge of the tool will always be at the right height whereas in the standard tool holder 38 shown in FIG. 7, the height of the cutting edge of the tool 46 must be adjusted by rocking the rocker member 36 each time the tool holder is inserted or even adjusted to a different position on the compound rest 14.

A tool holder 80 (FIG. 6) forming an alternate embodiment of the invention is generally like the tool holder 10 but has clamping screw 82 mounted on the opposite side of guideway 84 in head 86 from that on which the screw 28 (FIG. 5) is positioned, and inclined face 88 of clamping member 90 (FIG. 6) extends at an acute angle relative to guide face 92 of member 88, while the inclined face 26 (FIG. 5) of the clamping member 22 forms an acute angle with the face 29. When the screw 82 (FIG. 6) is turned in tapped bore 94 in a tightening direction, it forces righthand end of clamping member 90 tightly against wall 96 of the guideway 84 and the member 90 downwardly and to the left toward notch or corner portion 100 of guideway 102 and surfaces 101 and 103 of notch 104 in the clamping member 90 facing oppositely to the corner portion 100 bear against sides 105 and 107 of tool 108. The clamping member 90 forces sides 109 and 111 of corner 110 of the tool 108 tightly against surfaces 112 and 113 of the corner portion 100. The screw 82 wedges the clamping member 90 tightly against the tool 108 to rigidly lock the tool against movement relative to the tool holder 80. To make the tapped bore 94 sufficiently long to provide high strength for holding the screw 82 against the longitudinal thrust thereon, there is provided a boss 109 including the initial portion of the tapped bore 94. The boss 109 has the effect of permitting the tapped bore 94 to be long while projecting only slightly out beyond the side portion of the head 86 and the side face of shank 115 of the tool holder.

Both the screws 28 and 82 extend angularly relative to the guideways 33 and 84, respectively, and hold the clamping members 22 and 90 in positions rigidly locking the tools 16 and 108. The rigid locks thus formed prevent the clamping members from rocking back and forth from side to side in the guideways. The above tool holders 10 and 80 are very rugged and positively and precisely hold the tools 16 and 108 at the exact heights of the centerlines of the workpieces. Also, the tools can be set precisely in tool holders 10 and 80 with the aid of gauge 42 either while the tool holders are in lathes or while removed therefrom.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a lathe tool holder,
   a body member provided with a head portion having an elongated corner notch therein and also having a guideway extending longitudinally of the head portion and generally transversely from the longitudinal axis of the notch,
   the head portion having a tapped bore extending to the guideway at an acute angle relative to the longitudinal axis of the guideway,
   an elongated tool having a corner portion fitting into the notch,
   a clamping member slidable along the guideway for clamping the tool in the notch and having an end face normal to the tapped bore,
   and a clamping screw threaded into the tapped bore for engaging said end face of the clamping member to force the clamping member against one side of the guideway and against the tool to lock the tool rigidly in the tool holder.
2. The lathe tool holder of claim 1 wherein the longitudinal centerline of the guideways is offset laterally of a plane bisecting the corner notch in the head portion of the body member,
   the clamping member having in the end thereof opposite to said one end a notch facing the notch in the body member, the tool being substantially square in cross-section with opposite corners thereof fitting into the notches.

3. In a lathe tool holder,
a body member having a shank and a head portion generally angular to the shank,
the head portion having a passageway tilted slightly relative to the vertical and extending therethrough of generally square cross-sectional shape with one corner of the passageway being positioned near one end of the head portion,
the head portion also having a guideway extending transversely of the passageway and intersecting the passageway and extending parallel to and offset from a plane bisecting said one corner of the passageway,
the head portion also having a tapped bore extending into the guideway at an acute angle relative thereto,
an elongated tool having a generally square shank portion fitting slidably in the passageway,
a clamping screw threaded into the tapped bore,
and a clamping member slidable in the passageway and having a notched portion for engaging a corner of the tool opposite to said one corner of the passageway and having an end face engaged by the screw and extending at an acute angle relative to a side of the clamping member abutting one side of the guideway, whereby the screw forces the clamping member against said one side of the guideway and against the tool.

4. The tool holder of claim 3 wherein the tool is reversible end-for-end in the passageway and has a turning cutting edge portion at one end and a facing cutting edge portion at the other end of the notches more remote from the apices of the notches than the first portions are spaced from the tool.

5. In a lathe tool holder,
a body member having an elongated, horizontal shank and a head portion extending at an oblique angle from one end of the shank, having a passageway extending therethrough and tilted slightly relative to the vertical and of generally cross-sectional shape with one corner of the passageway being positioned near the end of the head portion more remote from the shank,
the head portion also having a guideway extending transversely of the passageway and intersecting the passageway and extending parallel to and offset from a plane bisecting said one corner of the passageway,
the head portion also having a tapped bore extending into the guideway toward the passageway and toward one side of the guideway,
an elongated tool having a generally square shank portion fitting slidably in the passageway,
a clamping screw threaded into the tapped bore and extending into the guideway,
and a clamping member slidable in the guideway and having a notched portion for engaging a corner of the tool opposite to said one corner of the passageway and having an end face engaged by the screw and extending at an acute angle relative to the side of the clamping member adjacent said one side of the guideway, whereby the screw forces the clamping member against said one side of the guideway and against the tool.

6. The tool holder of claim 1 wherein the body member has a shank portion provided with a bottom reference surface for positioning in a tool post with the bottom reference surface parallel to the top of a ring of the tool post,
the notch extending generally transversely of the reference surface,
the head portion also having a gauge surface positioned in a predetermined relationship to the bottom reference surface.

7. The tool holder of claim 6 including a gauge member having a bottom surface for slidably engaging the gauge surface and a downwardly directed surface for locating the cutting edge portion of the tool at a predetermined height above the bottom reference surface of the shank portion of the body member.

References Cited by the Examiner
UNITED STATES PATENTS

| | | | |
|---|---|---|---|
| 945,675 | 1/1919 | Barnes | 29—96 |
| 1,387,339 | 8/1921 | Banister | 29—96 |
| 1,575,314 | 3/1926 | Bousquet | 29—96 |
| 2,357,918 | 9/1944 | Trippler | 29—96 |
| 2,375,448 | 5/1945 | Talbot | 33—185 |
| 2,380,593 | 7/1945 | Hanes | 33—185 |
| 2,425,409 | 8/1947 | Wilson | 29—96 |
| 2,481,936 | 9/1949 | Lord | 33—185 X |
| 2,645,844 | 7/1953 | Longe | 29—96 |
| 2,683,302 | 7/1954 | Bader | 29—96 |
| 2,825,959 | 3/1958 | Bader | 29—96 |
| 3,106,023 | 10/1963 | Wilson | 33—185 X |

FOREIGN PATENTS

| | | |
|---|---|---|
| 363,274 | 7/1906 | France. |
| 21,028 | 9/1919 | France. |
| 1,059,290 | 11/1953 | France. |
| 596,472 | 1/1948 | Great Britain. |

WILLIAM W. DYER, JR., *Primary Examiner.*

HARRISON HINSON, *Examiner.*

UNITED STATES PATENT OFFICE
CERTIFICATE OF CORRECTION

Patent No. 3,267,553                     August 23, 1966

Peter E. Mortensen

It is hereby certified that error appears in the above numbered patent requiring correction and that the said Letters Patent should read as corrected below.

Column 1, line 27, for "forth" read -- both --; column 2, line 43, for "holder" read -- holders --; line 49, for "top" read -- tip --; line 52, for "reset" read -- rest --; column 4, line 70, for "guideways" read -- guideway --; column 6, line 31, for "1/1919" read -- 1/1910 --; line 47, for "9/1919" read -- 11/1919 --.

Signed and sealed this 1st day of August 1967.

(SEAL)
Attest:

Edward M. Fletcher, Jr.

Attesting Officer

EDWARD J. BRENNER

Commissioner of Patents